Figure 1:
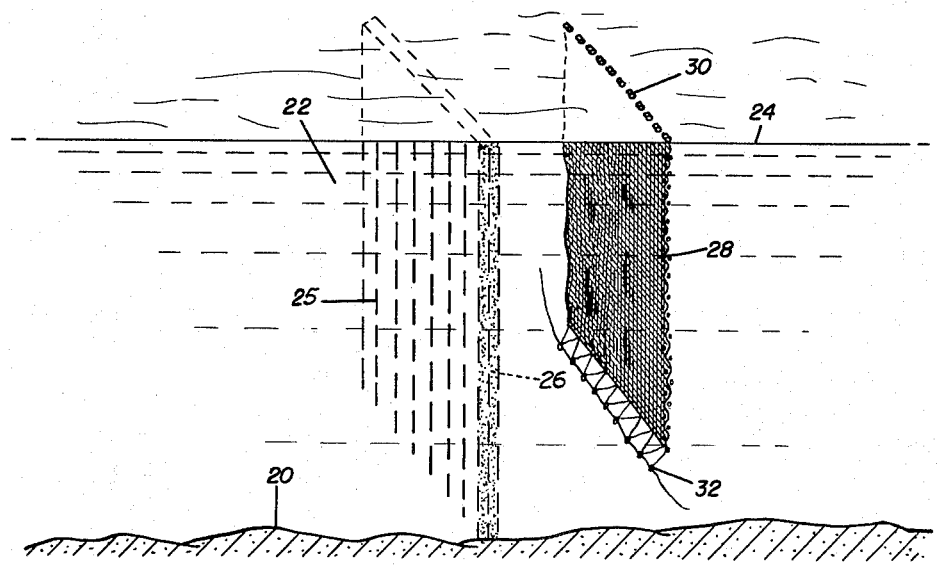

March 30, 1965     J. T. GONSALVES     3,175,319
METHOD OF PURSE SEINING
Filed Nov. 4, 1963

INVENTOR.
JOHN T. GONSALVES
BY
ATTORNEYS

United States Patent Office 3,175,319
Patented Mar. 30, 1965

3,175,319
METHOD OF PURSE SEINING
John T. Gonsalves, 30 S. Kenton, National City, Calif.
Filed Nov. 4, 1963, Ser. No. 321,180
2 Claims. (Cl. 43—4.5)

The present invention relates to a method of purse seining and comprises an improvement in the method disclosed in the Letters Patent to A. L. Allyn, No. 2,810,229, issued October 22, 1957.

It is well known in the fishing industry that the lowering of a seine or net has a disturbing influence on the fish, resulting in many fish escaping below and forwardly of the seine or net as it is being lowered and after it is lowered.

In practicing the improved method, I first coat a dye carrier with a water soluble dye such as that disclosed in the aforementioned patent to Allyn. This dye should have a color which contrasts materially with the color of the water. One of the preferred colors is yellow; another is red. The dye carrier or substance should be relatively inexpensive and I have chosen gravel or rocks of, one and one half to three inches in diameter, generically referred to herein as "rocks." These rocks are coated with gelatin which carries the dye.

These dye coated rocks and the purse seine are then loaded onto a ship such as a tuna boat. After a school of fish is cited and after the boat is maneuvered to the proper position to start the encompassing of the school with the purse seines, I start dropping the dye coated rocks, preferably from adjacent the bow of the boat. The water soluble dye starts dissolving immediately into vertical dye colored streamers of water, having a color of distinctive contrast with that of the water on opposite sides thereof, the streamers gradually spreading and forming a vertical curtain of dye colored water.

After starting the formation of the curtain, I start paying out the purse seine. These seines are provided with the usual pursing rings at the bottom thereof. Inasmuch as the dye coated rocks sink rapidly, and since the rocks sink to the bottom of the ocean or lake and since sufficient dye is coated on the rock, the aforementioned streamers are rapidly formed, extending from the surface of the water to the bottom of the ocean or lake. The formation of the colored streamers and curtain precedes the formation of the net curtain formed by the seine.

The boat is maneuvered to form a loop to thereby form streamers and a complete curtain of color which contrasts with that of the water within the confines of the curtain. For reasons unknown to me at the present time, the fish will be deterred in penetrating the area of the rapidly sinking colored streamer and are therefore entrained within the loop formed by said colored streamers. Of course a loop or a part of a loop is also being formed by the seine as the colored streamers and curtain are being formed. After all of the seine or seines have been payed out, the seine or seines are then pursed.

It is highly important to form the sinking colored streamers at a speed greater than the formation of the net curtain formed by the seine, since the lowering of the net has a disturbing influence on the fish as it is being lowered, resulting in the fish escaping below and forwardly of the seine. Also it is highly important that sufficient coating be applied to the rocks so as to form streamers of such depth which are at least equal to the depth at which the fish will lower themselves.

In practicing the present invention, I dissolve or mix the dye with a suitable water soluble gelatin, preferably of the type known as 100 bloom. In this manner sufficient dye can be entrained in the gelatin to form streamers of dye colored water which extend to the bottom of the area being fished.

Attempts are constantly made to observe and determine the direction of movement of the fish. This is often done by aircraft. When it is seen that the fish are endeavoring to escape from the loop or move the beyond the area to be encompassed by the seine, a speed boat or speed boats are rushed to the area toward which the fish are moving, and dye coated rocks are lowered into the water to corral the fish within area of the colored streamers formed by the dye. Often it is necessary to repeat the dropping of coated rocks within the loop area of the seine when it is seen that the fish are moving toward the seine, since the inhibiting of fish movement depends mostly on the action of creating the streamers, the curtain of colored water having only a minor effect in inhibiting the movement of fish therethrough.

The accompanying drawing should aid in illustrating the method.

Figure 2:
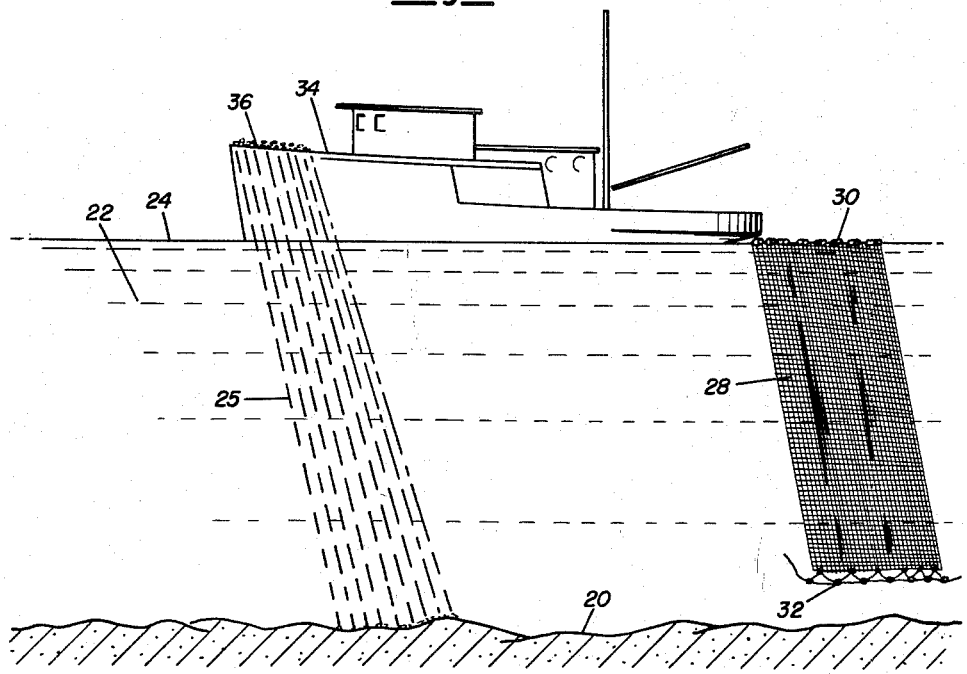

In the drawing:

FIG. 1 is a diagrammatic view showing the water, the earth, the colored streamers and colored curtain and the seine in section; and FIG. 2 is a diagrammatic view of a tuna boat function, i.e. the vessel for carrying the coated rocks, showing generally how the coated rocks forms the streamers, showing the seine being lowered, and showing the water and earth in section.

Referring now in detail to the drawing, the bottom of the ocean or lake is shown by the earth 20. The water is shown at 22 and surface thereof at 24. The colored streamers are shown at 25 and the colored curtain is depicted at 26; the purse seine is shown at 28. The loop of the seine surrounds the loop of the color streamers and curtain so as to be partly obscured by the colored streamers or curtain. The floats for the seine are shown at 30 and the purse rings are shown at 32.

Referring now to FIG. 2, the boat is shown at 34 and is shown as moving toward the left. Although the purse rings 32 effect the lowering of the seine, such lowering is deterred by the cords of the seine, and, to assure the formation of the colored curtain prior to the lowering of the seine, I drop the coated rocks from adjacent the front of the boat.

While the form of embodiment herein shown and described, constitutes preferred form, it is to be understood that other forms may be adopted falling within the scope of the claims that follow.

I claim:

1. The steps in the method of purse seining which includes:

(A) Coating rocks with a dye which is dissoluble in water and having the characteristic of inhibiting the passage of fish through vertical streamers of the dye dissolved in water;

(B) moving a vessel, bearing said coated rocks, through the water to form a loop course;

(C) dropping dye coated rocks from the vessel into the water as the vessel moves in said loop direction to form streamers of dye colored water;
(D) lowering the purse seine into the water, while the vessel is moving to form said loop course, at a rate which is at least as slow as the rate at which the colored streamers are formed whereby the depth of the streamers are at least as low as the lowermost edge of the seine when the seine is in its lowermost position;
(E) and then pursing the seine.

2. The steps in the method of purse seining which include:
(A) Coating rocks with a dye which is dissoluble in water and having the characteristic of inhibiting the passage of fish through vertical streamers of the dye dissolved in water;
(B) moving a vessel, bearing said coated rocks, through the water to form a loop course;
(C) dropping dye coated rocks from the vessel into the water as the vessel moves in said loop direction to form streamers of dye colored water;
(D) lowering the purse seine into the water while the vessel is moving to form said loop course and behind the dropping of the coated rocks and at a rate which is at least as slow as the rate at which the colored streamers are formed whereby the depth of the curtain is at least as low as the lowermost edge of the seine when the seine is in its lowermost position;
(E) and then pursing the seine.

References Cited by the Examiner
UNITED STATES PATENTS
2,810,229  10/57  Allyn _____ 43—4.5

References Cited by the Applicant
UNITED STATES PATENTS
1,079,576  11/13  Noyes.
1,340,677  5/20  Whitehead.
2,458,540  1/49  Tuve.
2,468,394  4/49  Dinsley.
2,699,751  1/55  Hasler.
2,860,600  11/58  Cheney.

ABRAHAM G. STONE, *Primary Examiner.*
F. RAY CHAPPELL, *Examiner.*